(12) United States Patent
Osada

(10) Patent No.: US 6,700,847 B2
(45) Date of Patent: Mar. 2, 2004

(54) RECORDING/REPRODUCING APPARATUS AND METHOD USING ACCURATE RECORDING/REPRODUCING CLOCK SIGNAL

(75) Inventor: Yutaka Osada, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 463 days.

(21) Appl. No.: 09/895,399

(22) Filed: Jul. 2, 2001

(65) Prior Publication Data

US 2002/0003764 A1 Jan. 10, 2002

(30) Foreign Application Priority Data

Jul. 5, 2000 (JP) ................................. P2000-204038

(51) Int. Cl.$^7$ ............................................. G11B 7/005
(52) U.S. Cl. ................................. 369/53.34; 369/47.31
(58) Field of Search .......................... 369/47.22, 47.28, 369/47.31, 47.48, 53.34

(56) References Cited

U.S. PATENT DOCUMENTS

| | | | | | |
|---|---|---|---|---|---|
| 5,063,546 | A | * | 11/1991 | Ito et al. ................. | 369/30.17 |
| 5,109,369 | A | * | 4/1992 | Maeda et al. ............ | 369/47.45 |
| 5,117,412 | A | * | 5/1992 | Ito et al. ................. | 369/109.02 |
| 5,528,573 | A | * | 6/1996 | Shim ....................... | 369/47.45 |
| 5,617,392 | A | * | 4/1997 | Shim ....................... | 369/47.48 |
| 6,088,307 | A | * | 7/2000 | Fushimi et al. .......... | 369/44.13 |
| 6,236,629 | B1 | * | 5/2001 | Hisakado et al. ........ | 369/47.32 |
| 6,252,836 | B1 | * | 6/2001 | Kobayashi ............... | 369/44.34 |
| 6,631,114 | B1 | * | 10/2003 | Kobayashi ............... | 369/275.4 |

FOREIGN PATENT DOCUMENTS

JP    10-293926    11/1998

OTHER PUBLICATIONS

Patent Abstracts of Japan, "Recording Clock Signal Generating Device". Publication No. 10–293926, date of publication: Nov. 4, 1998.

* cited by examiner

*Primary Examiner*—W. R. Young
(74) *Attorney, Agent, or Firm*—Nath & Associates PLLC

(57) ABSTRACT

A period accumulating portion inputs a reference clock "Clock 2" and a wobbling pulse WBLPOL_I obtained by binarizing a wobbling signal extracted from a reproduction output from a DVD, and accumulates and counts reference clocks "Clock 2" in an interval of predetermined periods of the wobbling pulses WBLPOL_I so as to obtain a count value "m". An average period detecting circuit obtains an average count value "n" corresponding to the interval of an averaged period of the wobbling pulse by dividing a count value of the reference clock "Clock 2" with a number of the predetermined periods. A divider generates a wobbling pulse WBLPOL_O having a constant period, deprived of a period fluctuation due to a prepit by dividing the reference clock based on the average count value. The phase of that generated wobbling pulse WBLPOL_O having the constant period is matched with the phase of a land prepit LPP by a LPP$_{Window}$ generating circuit, a phase comparator, an AC phase shifter and a PLL circuit, and the wobbling pulse, whose phase is matched, is outputted as a recording/reproducing clock signal WTCLK.

8 Claims, 5 Drawing Sheets

RECORDING/REPRODUCING APPARATUS AND METHOD USING ACCURATE RECORDING/REPRODUCING CLOCK SIGNAL

BACKGROUND OF THE INVENTION

1. Field of the Invention

The present invention relates to recording/reproducing apparatus and method preferable for application to a DVD reproducing apparatus and DVD recording/reproducing apparatus for carrying out recording and reproduction on an optical disc such as DVD-R, DVD-RW and the like.

2. Description of the Related Art

Conventionally, a write-once optical disc called compact disc-recordable (CD-R) has been widely prevailed as an optical disc capable of recording data. Wobbling grooves are formed in a data recording region of the CD-R such that they meander slightly depending on a wobbling signal indicating absolute position information or the like on a disc face. Data is recorded along this wobbling groove (the wobbling groove serves for a recording track).

When recording data in this recording track, a wobbling signal is detected from the wobbling groove so as to obtain absolute position information on the disc face, so that the data can be recorded at a target recording position appropriately.

Upon detecting the wobbling signal from the wobbling groove, reflected light of beam irradiated to the wobbling groove is received by a photo detector, whose entire light receiving region is divided to two parts with a dividing line optically parallel to a tangent line of the wobbling groove, and a differential of output from different light receiving regions is obtained and then, this differential signal is supplied to a band pass filter (BPF), in which a frequency (22.05 KHz) of a carrier of the wobbling signal is a central frequency. Consequently, the wobbling signal is detected form the wobbling groove.

When recording data in a recording track of the CD-R, a rotating operation of the CD-R is controlled so that the frequency of a wobbling signal extracted through the BPF turns to the predetermined frequency. Further, the wobbling signal extracted through the BPF is used as a reference signal for generating the recording clock signal.

The wobbling signal is continuous signal containing a frequency component synchronous with a rotation of the CD-R. Therefore, if a clock signal synchronous with the phase of this wobbling signal is generated with such wobbling signal as a reference signal, the clock signal used for recording accurately synchronous with a rotation of the CD-R can be generated.

In the meantime, improvement of recording capacity has been aggressively considered in the field of the write-once optical disc such as the CD-R. In recent years, development of digital versatile disc-recordable (DVD-R) has been accelerated as the write-once optical disc having a recording capacity about seven times that of the CD-R.

In the DVD-R, the pitch between adjacent recording tracks is substantially half that of the CD-R in order to increase the recording capacity aiming at intensifying the recording density. For the reason, when the wobbling signal is detected, a cross-talk is generated from right and left wobbling grooves located adjacent each other, so that the amplitude and phase of the wobbling signal may be fluctuated. Particularly, there occurs a problem that the wobbling signal in which the phase thereof is fluctuated by an influence of the cross-talk disables generation of a recording clock signal accurately synchronous with the rotation of the DVD-R.

As a method which solves such a problem and generates a recording clock signal accurately synchronous with the rotation of the DVD-R, according to Japanese Patent Application Laid-Open No. H10-293926, a difference in phase between the wobbling signal and a prepit signal from a prepit generated in land between adjacent grooves is detected and then, the difference in phase of the recording clock signal is adjusted based on this phase difference signal.

In the DVD-R, the prepit is generated in land between adjacent wobbling grooves corresponding to a prepit signal indicating absolute position information or the like on the disc face. By detecting the prepit signal from this prepit so as to obtain the absolute position information on the disc face, data can be recorded appropriately at a target recording position.

The prepit is recorded having a predetermined relation in phase with the wobbling signal and generated between adjacent lands such that the prepits do not overlap in the disc diameter direction. Therefore, the prepit signal detected from the prepit is not affected by the cross-talk.

According to technology disclosed in the aforementioned Japanese Patent Application Laid-Open No. H10-293926, by making effective use of the prepit signal when generating the recording clock signal, even if the wobbling signal is fluctuated in its time axis due to an influence of the cross-talk, the recording clock signal generated based on this wobbling signal is corrected appropriately. As a result, a recording clock signal accurately synchronous with the rotation of the DVD-R is obtained.

In the aforementioned DVD-R, when detecting the wobbling signal, the period of the wobbling signal is fluctuated by an influence of the prepit generated in a land adjacent the wobbling groove.

On the other hand, in the recording clock signal generating apparatus disclosed in Japanese Patent Application Laid-Open No. H10-293926, a BPF, which employs the frequency of a carrier of the wobbling signal as its central frequency, is used as a wobbling signal extracting means and a BPF output is binarized so as to extract the wobbling signal.

However, because in case of the DVD-R, the aforementioned prepit is generated such that it appears at every 16 periods of the wobbles in the wobbling groove and that further, the prepit appears on both sides of the wobbling groove, the period fluctuation of the binary signal produced by binarizing through the BPF is increased, so that an appropriate recording clock signal becomes difficult to generate.

Although a phase locked loop (PLL) circuit may be used for removing an influence by the prepit, if it is intended to remove the influence of the prepit using the PLL circuit, it is difficult to set up a range in which the PLL circuit is placed and further, the PLL circuit may make complicated the entire circuit structure of the recording clock signal generating apparatus.

SUMMARY OF THE INVENTION

The present invention has been achieved in views of the above-described problem and therefore, an object of the present invention is to provide recording/reproducing apparatus and method capable of obtaining an accurate recording/reproducing clock signal by removing an influence of the prepit upon the wobbling signal with a simple structure.

To achieve the above-described object, there is provided a recording and reproducing apparatus for recording and reproducing information in and from a disc-like recording medium including recording tracks each wobbled according to a predetermined frequency and information recording portions in which at least address information is recorded at a predetermined wobbling period interval, the recording and reproducing apparatus comprising: wobbling signal extracting means for extracting a wobbling signal from a reproduction output from the disc-like recording medium; reference clock generating means for generating a reference clock having a period shorter than the period of the wobbling signal; count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value; dividing means for obtaining an average count value corresponding to an interval of an averaged period of the wobbling pulse by dividing the count value from the count means with the number of the predetermined periods; and wobbling pulse generating means for generating a wobbling pulse having a constant period as a recording and reproducing clock signal by dividing the reference clock based on the average count value.

According to a preferred embodiment of the present invention, at every second predetermined periods of the wobbing pulse, processing with the count means and the dividing means are carried out so as to update the average count value.

According to another preferred embodiment of the present invention, at the time of change-over from recording of information to reproduction and change-over from reproduction of information to recording, updating of the average count value is not carried out for a predetermined time.

According to still another preferred embodiment of the present invention, the count means starts accumulation and count of the reference clocks from a beginning of a wobbling pulse at a timing immediate before a wobbling pulse at a timing corresponding to a detection of the information recording portion.

According to other preferred embodiment of the present invention, the recording and reproducing apparatus further comprises a phase adjusting means for adjusting the phase of the generated wobbling pulse having the constant period with respect to a recording timing of information recorded in the information recording portion.

To achieve the above-described object, there is provided a recording apparatus for recording information in a disc-like recording medium including recording tracks each wobbled according to a predetermined frequency and information recording portions in which at least address information is recorded at a predetermined wobbling period interval, the recording apparatus comprising: wobbling signal extracting means for extracting a wobbling signal from a reproduction output from the disc-like recording medium; reference clock generating means for generating a reference clock having a period shorter than the period of the wobbling signal; count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value; dividing means for obtaining an average count value corresponding to an interval of an averaged period of the wobbling pulse by dividing the count value from the count means with the number of the predetermined periods; and wobbling pulse generating means for generating a wobbling pulse having a constant period as a recording clock signal by dividing the reference clock based on the average count value.

To achieve the above-described object, there is provided a reproducing apparatus for reproducing information from a disc-like recording medium including recording tracks each wobbled according to a predetermined frequency and information recording portions in which at least address information is recorded at a predetermined wobbling period interval, the recording and reproducing apparatus comprising: wobbling signal extracting means for extracting a wobbling signal from a reproduction output from the disc-like recording medium; reference clock generating means for generating a reference clock having a period shorter than the period of the wobbling signal; count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value; dividing means for obtaining an average count value corresponding to an interval of an averaged period of the wobbling pulse by dividing the count value from the count means with the number of the predetermined periods; and wobbling pulse generating means for generating a wobbling pulse having a constant period as a reproducing clock signal by dividing the reference clock based on the average count value.

To achieve the above-described object, there is provided a recording and reproducing method for recording and reproducing information in and from a disc-like recording medium including recording tracks each wobbled according to a predetermined frequency and information recording portions in which at least address information is recorded at a predetermined wobbling period interval, the method comprising the steps of: extracting a wobbling signal from a reproduction output from the disc-like recording medium; generating a reference clock having a period shorter than the period of the wobbling signal; binarizing the extracted wobbling signal to obtain a wobbling pulse; counting and accumulating the number of pulses of the reference clock for predetermined periods of the wobbling pulse to obtain a count value; obtaining an average count value corresponding to an interval of an averaged period of the wobbling pulse by dividing the count value with the number of the predetermined periods; and generating a wobbling pulse having a constant period as a recording and reproducing clock signal by dividing the reference clock based on the average count value.

The nature, principle and utility of the invention will become more apparent from the following detailed description when read in conjunction with the accompanying drawings.

DESCRIPTION OF THE PREFERRED EMBODIMENTS

The recording/reproducing apparatus and method of the present invention can be applied to a disc recording/reproducing apparatus for recording/reproducing data in the DVD-R or DVD-RW. Hereinafter, the recording/reproducing apparatus will be described about a case where the DVD-R is employed as the disc-like recording medium.

Figure 1:
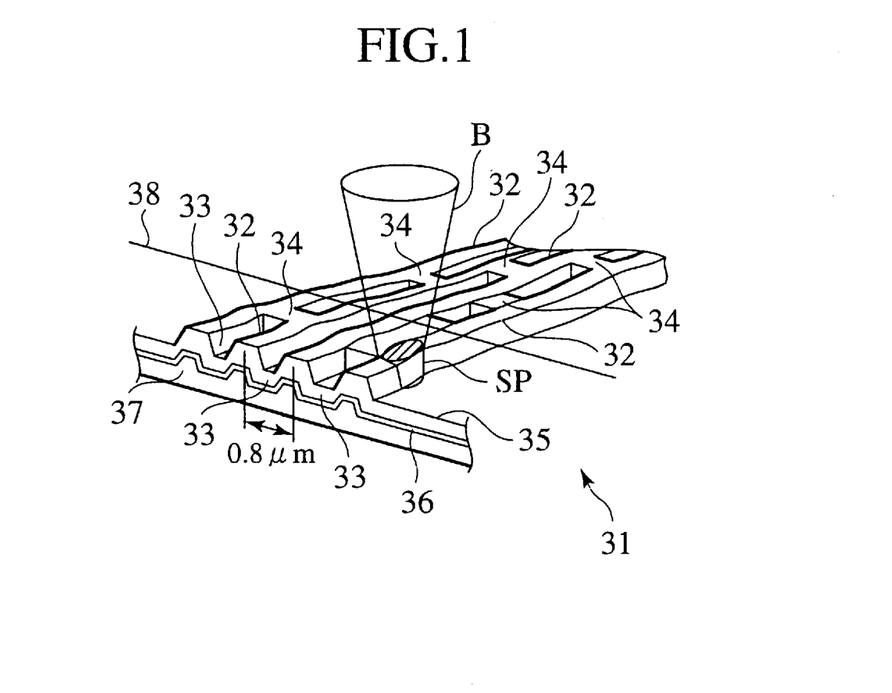
FIG. 1 is a diagram showing the structure of a DVD-R for use in a disc recording/reproducing apparatus according to an embodiment of the present invention.

First, in the DVD-R31 for use in the disc recording/reproducing apparatus of this embodiment, as shown in FIG. 1, concave wobbling grooves 32 and convex lands 33 are formed spirally or coaxially on a face of a transparent substrate 38 alternately by injection molding or the like.

Pigment film 35 is formed on the wobbling groove 32 and the land 33 as data recording layer. Light beam B for recording modulated corresponding to data which should be recorded (hereinafter referred to as recording data) in the DVD-R31 is irradiated on the pigment film 35 from the other side of the substrate 38 so as to generate a pit string depending on the recording data irreversibly. Thus, the optical disk is a write-once one.

This DVD-R31 has the wobbling groove 32 wobbled depending on the wobbling signal containing a predetermined frequency component. The DVD-R31 is an optical disc of so-called groove recording type and a place where this wobbling groove 32 is generated is set up as a data-recording track for recording the aforementioned recording data.

In this DVD-R31, a prepit 34 in which, for example, address information (absolute position information) or the like on a disc face is recorded, is generated in the land 33 between the adjacent wobbling grooves 32.

Further, gold evaporated film 36 is generated below the pigment film 35. In the DVD-R31, when reproducing recording data recorded in the data recording track, light beam B for reproduction irradiated on the data recording track is reflected by this gold evaporated film 36 at a high reflection factor. Further, protective film 37 is formed under the gold evaporated film 36.

When recording data in such DVD-R31, a wobbling frequency is detected from the wobbling groove 32 provided as the data recording track and the DVD-R31 is driven based on this wobbling frequency. Address information and the like are detected from the prepit 34, a recording position is detected based on this address information and then the recording data is recorded in this wobbling groove 32.

When recording data, light beam B for recording modulated corresponding to the recording data is irradiated such that the center of the light spot coincides with the centerline of the wobbling groove 32. Consequently, a pit string corresponding to the recording data is generated in the data-recording track on the wobbling groove 32 so as to record data. The size of the light spot of the light beam B for recording is set such that as shown in FIG. 1, part of the light beam is irradiated to not only the wobbling groove 32 but also the adjacent lands 33.

Part of the reflected light from the light spot SP formed on the land 33 is received by a photo detector divided by optically parallel dividing line to the tangent line of the wobbling groove 32, that is, a rotation direction of the DVD-R31 and then, for example, a push-pull signal is generated based on the output of this photo detector and subjected to tracking servo. Further, the wobbling signal of the wobbling groove 32 is extracted from the photo detector so as to generate a recording clock signal, which will be described later, synchronous with a rotation of the DVD-R31 based on this wobbling signal.

Next, the recording format for the address information recorded preliminarily in the DVD-R31 will be described with reference to FIG. 2.

Figure 2:
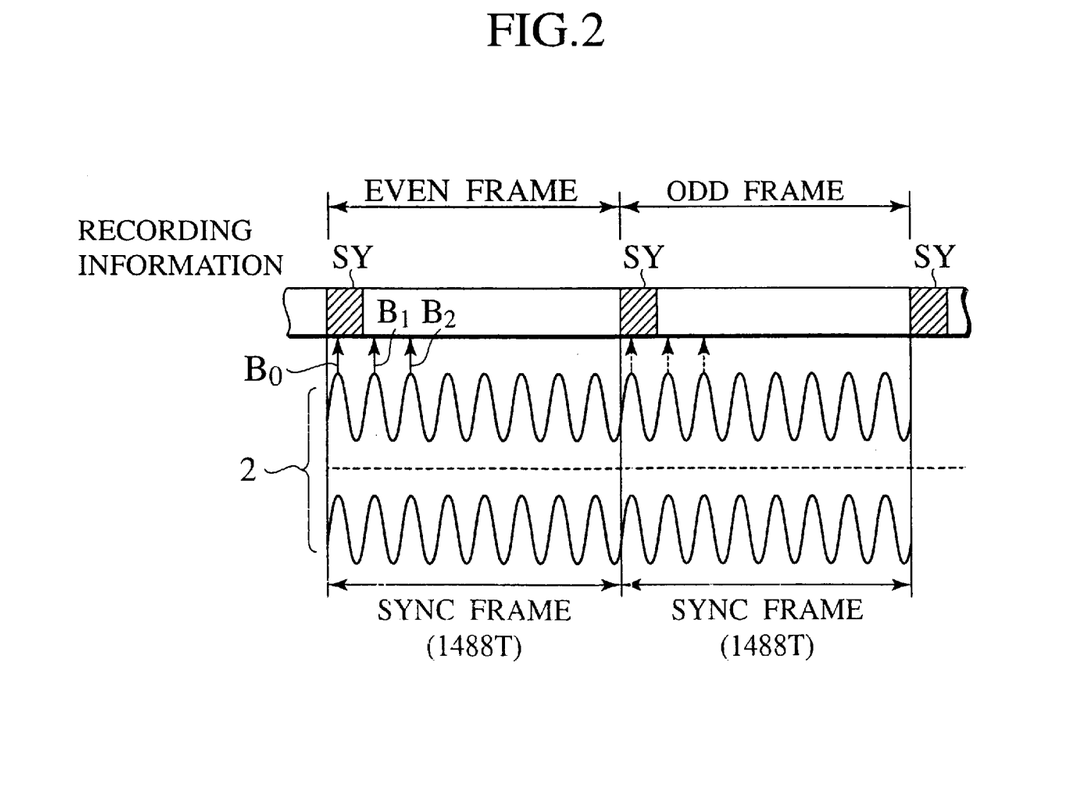
FIG. 2 is a diagram showing an example of format on the DVD-R.

In FIG. 2, an upper row indicates a recording format for the recording data while waveform in a lower row indicates wobbling state (meandering verified as viewing the wobbling groove 32 in a direction perpendicular to a disc face) of the wobbling groove 32 for recording the recording data. A upward arrow between the upper row indicating the recording format for the recording data and the lower row indicating the wobbling state of the wobbling groove 32 indicates schematically a position in which the prepit 34 is to be generated.

Meanwhile, the wobbling state of the wobbling groove 32 in FIG. 2 is expressed with amplitude larger than actual amplitude to facilitate understanding thereof. Actually, the recording data is recorded on the centerline of the wobbling groove 32 as described above.

As shown in FIG. 2, the recording data recorded in the DVD-R31 is preliminarily divided to every sync frame, which is an information unit. A single recording sector is composed of 26 sync frames. A single error correcting code (ECC) block is composed of 16 recording sectors. Meanwhile, a sync frame has a length 1488 times as long as a unit length T corresponding to a pit interval specified by a recording format upon recording the recording data. In a portion corresponding to the length of 14T at the head of a sync frame, synchronous information SY for obtaining synchronism of each sync frame is recorded.

On the other hand, the address information to be recorded in the DVD-R31 is recorded preliminarily in each sync frame of the recording data upon manufacturing the disc. When the address information is recorded in the DVD-R31 by the prepit 34, a prepit 34 (hereinafter referred to as prepit B0) indicated with an arrow B0 in FIG. 2 is generated to serve as a synchronous signal for address information on the land 33 adjacent to a region in which the synchronous information SY in each sync frame of the recording data is recorded and then, both or one of the prepits 34 (hereinafter referred to as prepit B1, prepit B2) indicated with arrows B1, B2 in FIG. 2 are generated on the land 33 adjacent to a front half portion excluding the region in which the synchronous information SY in each sync frame is recorded, in order to indicate the content of the address information to be recorded.

However, the prepit B1 or B2 may not be generated in the front half portion excluding the region in which the synchronous information SY in each sync frame is to be recorded, depending on the content of the address information to be recorded.

At this time, in a recording sector, the prepit 34 is generated in every other sync frame and the address information is recorded. In a recording sector, EVEN frame and ODD frame continue alternately. If the prepit 34 is generated in the EVEN frame as indicated with an upward arrow of solid line in FIG. 2, no prepit 34 is generated in the ODD frame. On the other hand, if the prepit 34 is generated in the ODD frame as indicated with an upward arrow of dotted line in FIG. 2, no prepit 34 is generated in the EVEN frame.

When generating the prepit in the EVEN frame, all prepits, that is, the prepit B0, prepit B1, prepit B2 are generated in a head sync frame of a recording sector, and in sync frames except the head of the recording sector, when the address information to be recorded in that sync frame is "1", only the prepits B0, B2 are generated while when the address information to be recorded is "0", only the prepits B0, B1 are generated.

Further, when generating the prepit in the ODD frame, only the prepits B0, B1 are generated in a head sync frame of the recording sector, while in sync frames except the head of the recording sector, same condition is produced as in the aforementioned EVEN frame.

Which sync frame of the EVEN frame or the ODD frame the prepit 34 should be generated is determined depending on the position of the prepit 34 generated on the adjacent land 33 ahead.

That is, usually, the prepit 34 is generated in the EVEN frame. If the prepit 34 to be generated in the EVEN frame 34 overlaps the prepit 34 on the adjacent land 33 precedingly generated in the diameter direction, this prepit 34 is generated in the ODD frame.

Figure 3:
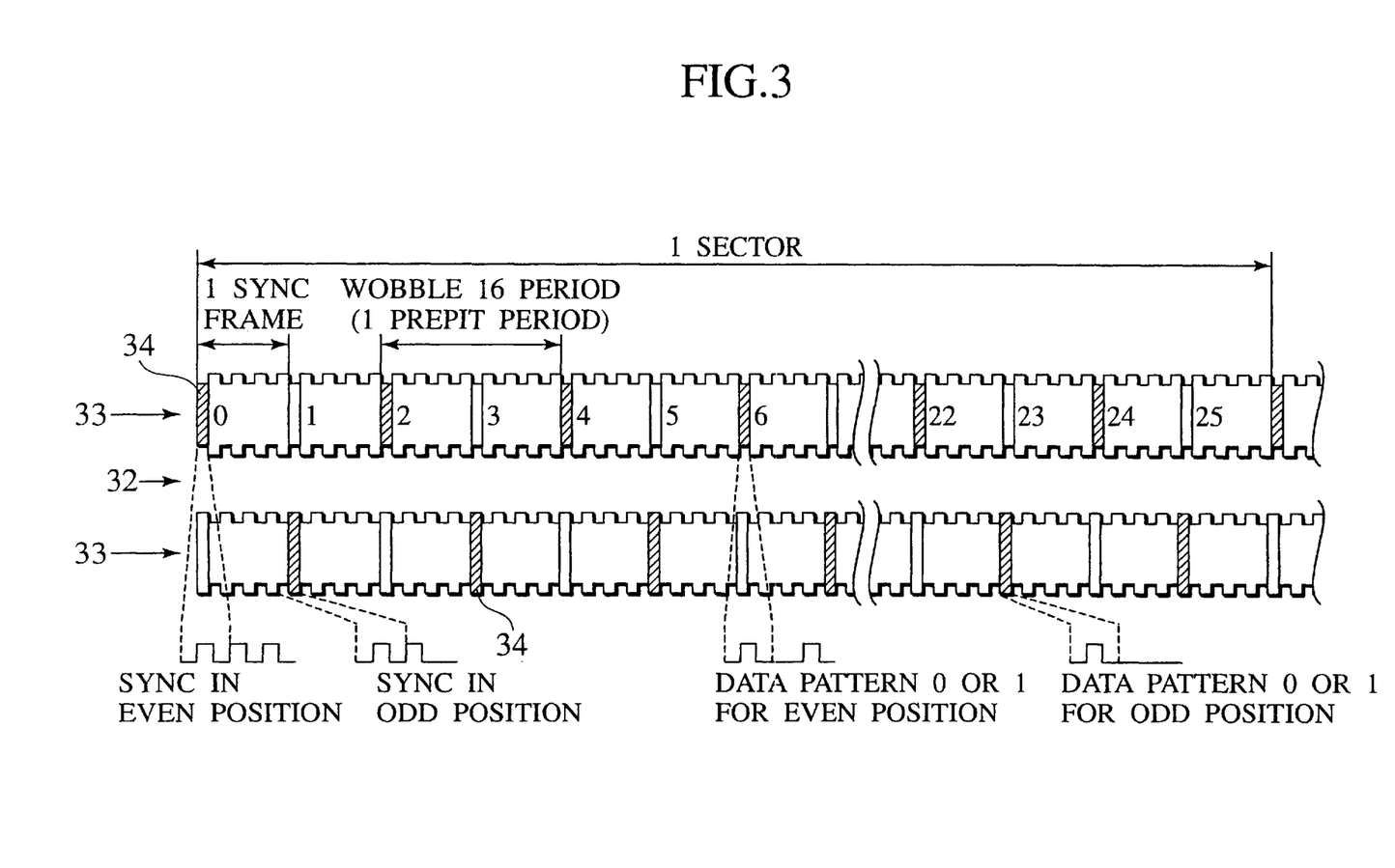
FIG. 3 is a diagram showing a relation between a wobbling groove and a pre-pit formed in the DVD-R.

In other words, the prepit 34 is generated such that it does not overlap the diameter direction of the DVD-R31 between the lands 33 adjacent each other as shown in FIG. 3. If the prepit 34 is generated in such a manner, there is no opportunity that the prepit 34 is generated at a position overlapping the diameter direction of the DVD-R between the adjacent lands 33. Thus, when detecting the prepit 34, an influence of cross-talk can be reduced.

Meanwhile, a sync frame whose head is indicated with a black belt on the land 33 in FIG. 3 is a sync frame in which the prepit 34 is generated, while a sync frame whose head is indicated with a blank belt is a sync frame in which no prepit 34 is generated.

On the other hand, the wobbling groove 32 is wobbled at a constant wobbling frequency f0 (frequency in which a wobbling signal corresponding to eight cycles of wobbles is contained in a sync frame) of about 140 KHz throughout an entire sync frame. Then, by extracting this constant wobbling frequency f0 by means of a disc recording/reproducing apparatus, which will be described later, a signal for controlling a rotation of the DVD-R31 is detected and further, a recording clock signal is generated.

The prepits B0–B2 are generated preliminarily at the time of manufacturing a disc in order to make constant a relation in phase between the prepit 34 and the wobbling signal and the prepits B1, B2 are generated every 186T(1488T/8) minutes from the prepit B0.

As described above, the prepit 34 is generated in the land 33 of every other sync frame, such that it does not overlap, in the diameter direction of the DVD-R31, with the adjacent one on the adjacent land 33. Therefore, the prepit 34 appears in every 16 wobble cycles of the wobbling groove 32 in two lands 33 adjacent a wobbling groove 32 and further, that prepit 34 appears alternately on both sides of the wobbling groove 32.

Figure 4:
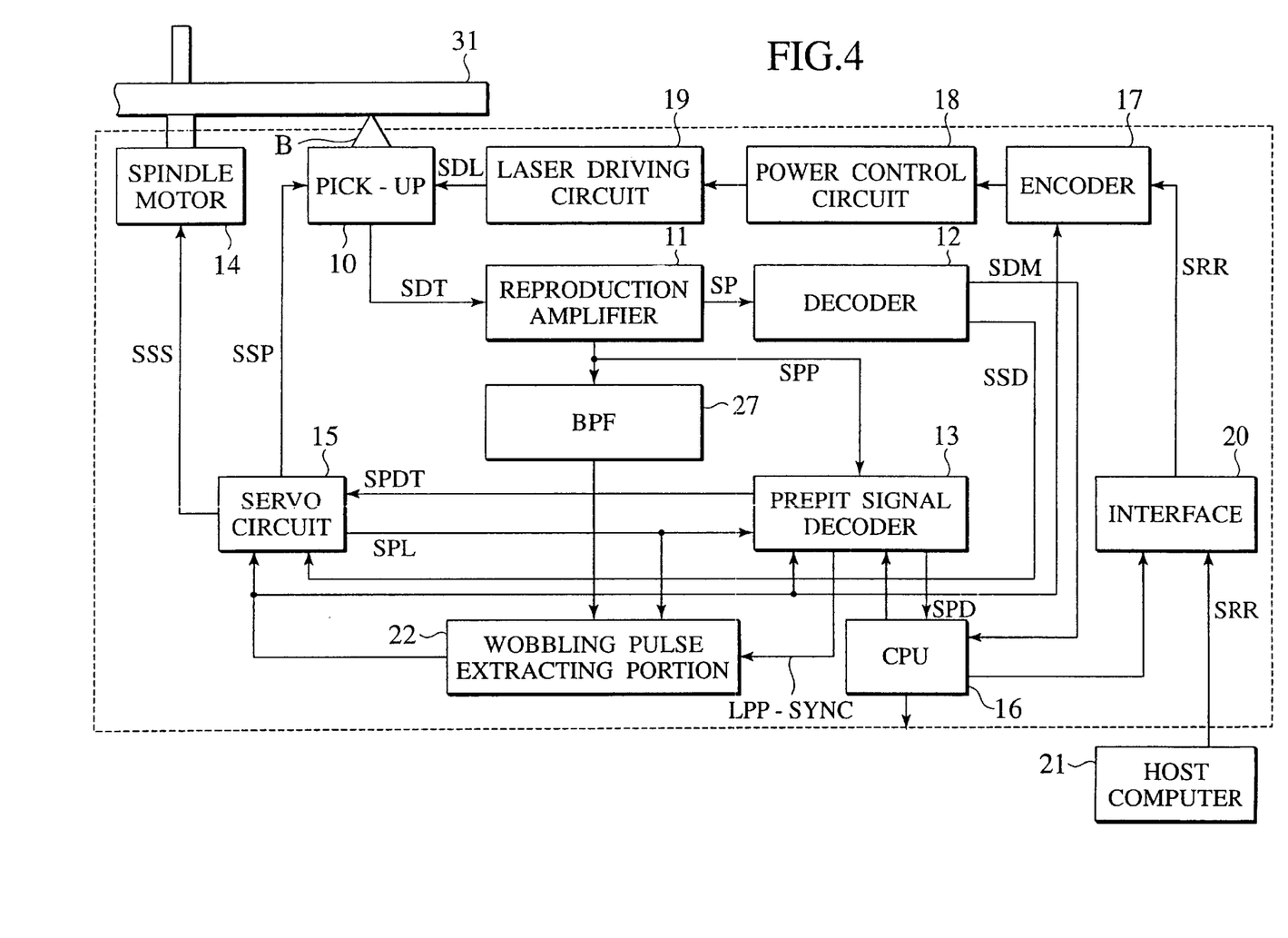
FIG. 4 is a block diagram of an entire disc recording/reproducing apparatus according to an embodiment of the present invention.

Next, FIG. 4 is a block diagram showing an entire disc recording/reproducing apparatus of this embodiment. As shown in FIG. 4, the disc recording/reproducing apparatus of this embodiment comprises a pickup 10, a reproduction amplifier 11 (AGC) in which a gain is controlled so as to make an output signal from this pickup 10 at an optimum level, a band pass filter (BPF) for extracting a wobbling signal from reproduced data from the reproduction amplifier 11, and a wobbling pulse extracting portion 22 for correcting the phase period of a wobbling signal extracted by the BPF 27 to an accurate phase period.

This disc recording/reproducing apparatus further comprises a decoder 12, a prepit signal decoder 13, a spindle motor 14, a servo circuit 15, a processor (CPU) 16, an encoder 17, a power control circuit 18, a laser driving circuit 19 and an interface 20.

An external unit such as a host computer is connected to this disc recording/reproducing apparatus. In this case, digital data SRR (recording data) is supplied to the DVD-R31 through an interface 20 from the host computer 21.

In such a disc recording/reproducing apparatus, recording data SRR from the host computer 21 is supplied to an encoder 17 through the interface 20 and then, subjected to encode processing by the encoder 17. After the level is controlled by a power control circuit 18, it is supplied to a laser driving circuit 19.

The laser driving circuit 19 generates a laser driving signal SDL corresponding to this recording data SRR and supplies this to the pickup 10. A recording light beam B modulated corresponding to the recording data SRR through the pickup 10 is irradiated onto the data-recording track of the DVD-R31, which is driven by a spindle motor 14. Then, a pit string corresponding to the recording data SRR is generated irreversibly on the data-recording track of the DVD-R31, so that writing of the recording data is carried out. At this time, the pickup 10 detects light reflected by the DVD-R31 of light beam by means of an internal photo detector and supplies this detection signal SDT to the reproduction amplifier 11.

The detection signal SDT contains information corresponding to the prepit and wobbling frequency of the wobbling groove. The reproduction amplifier 11 amplifies this detection signal SDT with a gain controlled so as to obtain an optimum output level and outputs pre-recording information signal SPP corresponding to the prepit and wobbling frequency of the wobbling groove.

The decoder 12 decodes the amplification signal SP by carrying out 8/16 demodulation processing, deinterleave processing and the like on the amplification signal SP supplied from the reproduction amplifier 11, supplies the demodulation signal SDM to the CPU 16 and supplies the servo demodulation signal SSD to the servo circuit 15.

The band pass filter 27 (BPF) extracts a wobbling signal from the pre-recording information signal supplied from the reproduction amplifier 11 and supplies this to a wobbling pulse extracting portion 22. The wobbling pulse extracting portion 22 makes constant the phase period of the wobbling signal supplied from the BPF 27 as described later and supplies this to the servo circuit 15, the prepit signal decoder 13 and the encoder 17 as a recording clock.

The prepit signal decoder 13 extracts only a signal component of the prepit signal in the prepit 34 from the prepit recording information signal SPP. Then, the signal component of this extracted prepit signal is supplied to the servo circuit 15 and the wobbling pulse extracting portion 22 as the prepit detection signal SPDT. The prepit signal decoder 13 decodes a signal component of the extracted prepit signal and supplies it to the CPU 16 as the demodulated prepit signal SPD.

Further, the prepit signal decoder 13 detects a syncronous pattern (land prepit sync: LPP_sync) recorded at every 16 periods of the wobbling signal from the extracted prepit signal as described with reference to FIG. 3 and supplies this to the wobbling pulse extracting portion 22.

The servo circuit 15 generates a pickup servo signal SSP for carrying out focus servo control, tracking servo control and access control based on the prepit signal SPDT supplied from the prepit signal decoder 13 and on the servo demodulation signal SSD supplied from the decoder 12 and supplies this pickup servo signal SSP to the pickup 10.

Further, the servo circuit 15 generates a spindle servo control signal SSS for controlling a rotation of the spindle motor 14 based on the recording clock supplied from the wobbling pulse extracting portion 22 and supplies this spindle servo control signal SSS to the spindle motor 14.

The interface 20 carries out interface operation for fetching the recording data SRR supplied from the host computer 21 into an appropriate disc recording/reproducing apparatus and supplies the fetched recording data SRR to the aforementioned encoder 17.

Figure 5:
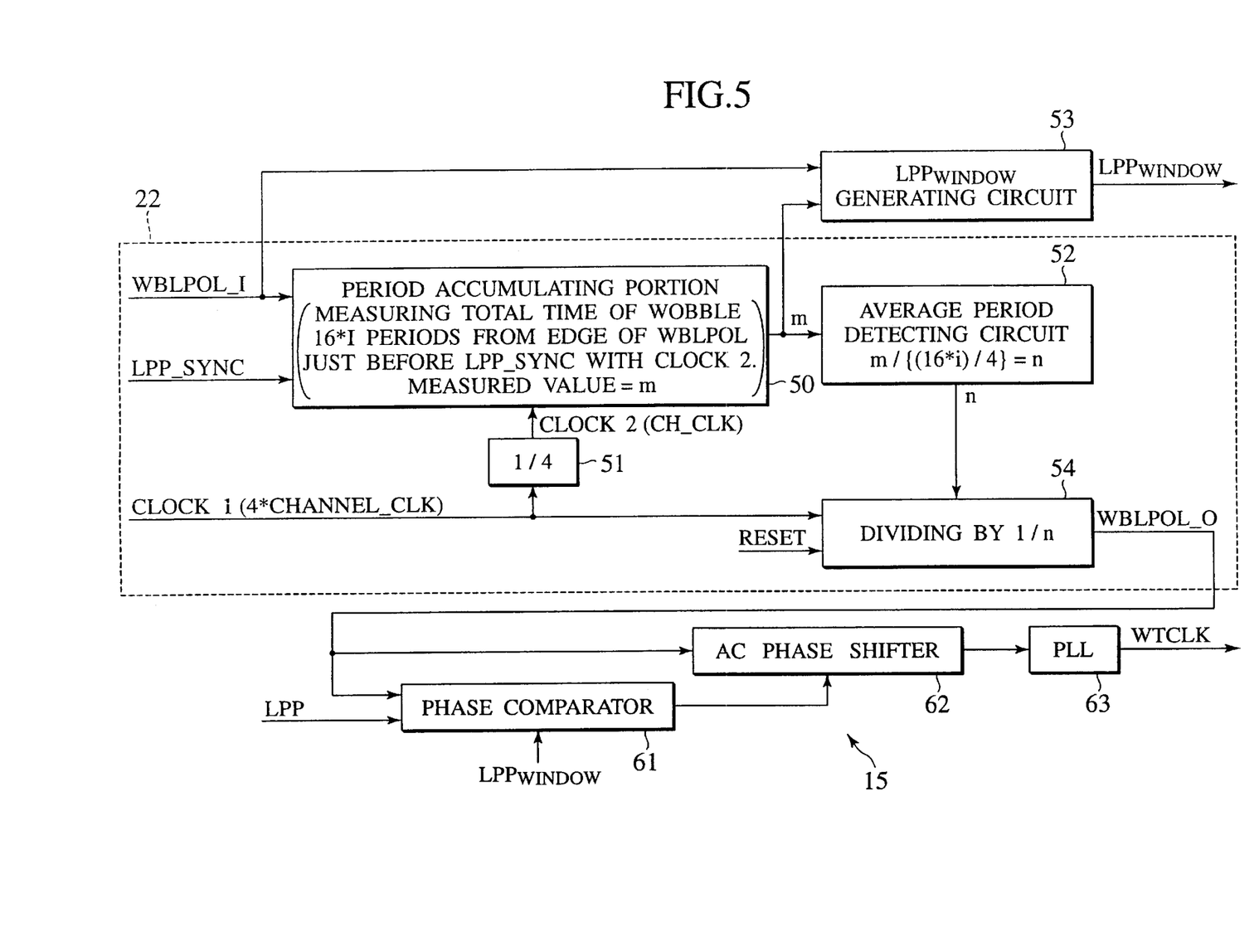
FIG. 5 is a block diagram of a wobbling pulse extracting portion provided in the disc recording/reproducing apparatus according to an embodiment of the present invention.

Next, generation operation for the recording clock in the disc recording/reproducing apparatus of this embodiment will be described. FIG. 5 is a diagram showing the structure block of the aforementioned wobbling pulse extracting portion 22 and part of the servo circuit 15 in the disc recording/reproducing apparatus of this embodiment.

In FIG. 5, a block surrounded by a dotted line is a block diagram showing the wobbling pulse extracting portion 22. In this wobbling pulse extracting portion 22, after binarizing the wobbling signal from the aforementioned BPF 27 and removing noise, wobbling pulse (WBLPOL_I) is supplied to a period accumulating portion 50. To this period accumulating portion 50 is supplied land prepit sync (LPP sync) from the prepit signal decoder 13 and also supplied a reference signal (Clock 2) obtained by dividing a reference clock (Clock 1) from an oscillator(not shown)into 1/4 by a divider 51. The reference clock (Clock 2) obtained by dividing into 1/4 is a reference clock having a period extremely shorter than that of the wobbling signal.

The period accumulating portion 50 starts count of the reference clock (Clock 2) obtained by the 1/4 division at a timing of an edge of the wobbling pulse (WBLPOL_I) supplied just before the land prepit sync (LPP_sync) is supplied and supplies a count value (measured value m) corresponding to plural prepit periods (16×i) of the wobbling pulse to an average period detecting circuit 52 and a LPP$_{Window}$ generating circuit 53.

The average period detecting circuit 52 calculates a reference clock number n corresponding to the average period of the wobbling pulse by dividing a count value sent from the period accumulating portion 50 by accumulated wobbling period (16 periods)×prepit period (i) (m/{(16×i)/4}=n) and supplies this result to the divider 54.

More specifically, a period between the prepits preliminarily recorded in the land 33 is 16-wobble period as described with reference to FIG. 3 (1 prepit period=16-wobble period). Further, the count period (i) of the prepit period in the period accumulating portion 50 is variable to, for example, 1 prepit period–13 prepit period (i=1–13) and the like.

If the count period number is set up to i=5 period, the period accumulating portion 50 supplies a count value of the reference clock (Clock 2) corresponding to this 5 period, and if the count period number is set up to i=12 period, supplies a count value of the reference clock (Clock 2) corresponding to this 12 period to the average period detecting circuit 52 and the like.

If the count period number is set up to, for example, 5 period, the average period detecting circuit 52 divides the count value sent from the period accumulating portion 50 by "16×5" so as to calculate an average value n (an average count value corresponding to a wobbling pulse in a prepit period) of the count value corresponding to a prepit period and supplies this result to the divider 54. If the count period number is set to 12 period, the average period detecting circuit 52 divides a count value sent from the period accumulating portion 50 by "16×12" so as to calculate a reference clock number n corresponding to the average period of the wobbling pulse and supplies this result to the divider 54.

If the average value n is supplied from the average period detecting circuit 52, the divider 54 registers this and after that, carries out generating operation for the wobbling pulse (WBLPOL_O) using this average value n.

That is, the divider 54 is supplied with the reference clock (Clock 1) supplied to the divider 51 also in order to divide the reference clock number corresponding to an average period of the wobbling pulse so as to have a substantially same period as the wobbling signal. This reference clock (Clock 1) is divided by the aforementioned registered average value n to generate an accurate constant-period wobbling pulse (WBLPOL_O) and then, this is supplied to a phase comparator 61 and an AC phase shifter 62 in the servo circuit 15.

Because 1 prepit period=16 wobble period as described previously, a period fluctuation is caused by the prepit at every 16 wobble periods in the wobbling signal extracted by the BPF 27. Assuming that a rotation speed of the DVD-R31 is of a constant linear speed, the period fluctuation of plural prepit periods (16 wobble period×i) measured by the average period detecting circuit 52 is extremely smaller than the period fluctuation of a prepit period. Thus, if the count value (total time) of the plural prepit periods is divided by the accumulated prepit periods so as to calculate an average prepit period and this average prepit period signal is outputted from the divider 54 as the wobbling pulse (WBLPOL_O) as mentioned in this embodiment, a wobbling pulse having an accurate period, deprived of the period fluctuation due to the prepit, can be generated and outputted.

Figure 6:
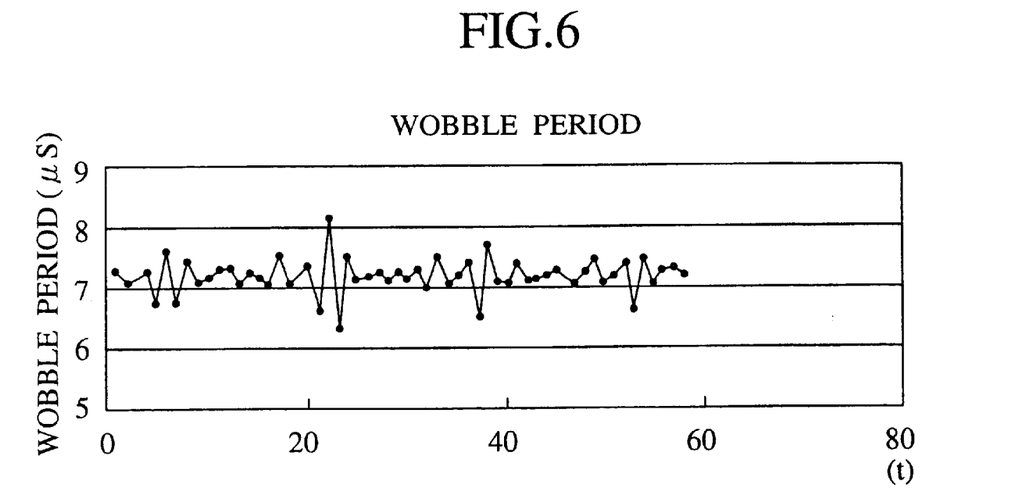
FIG. 6 is a diagram for explaining a cycle deviation of the wobbling pulse outputted from a BPF provided in the disc recording/reproducing apparatus according to an embodiment of the present invention.
Figure 7:
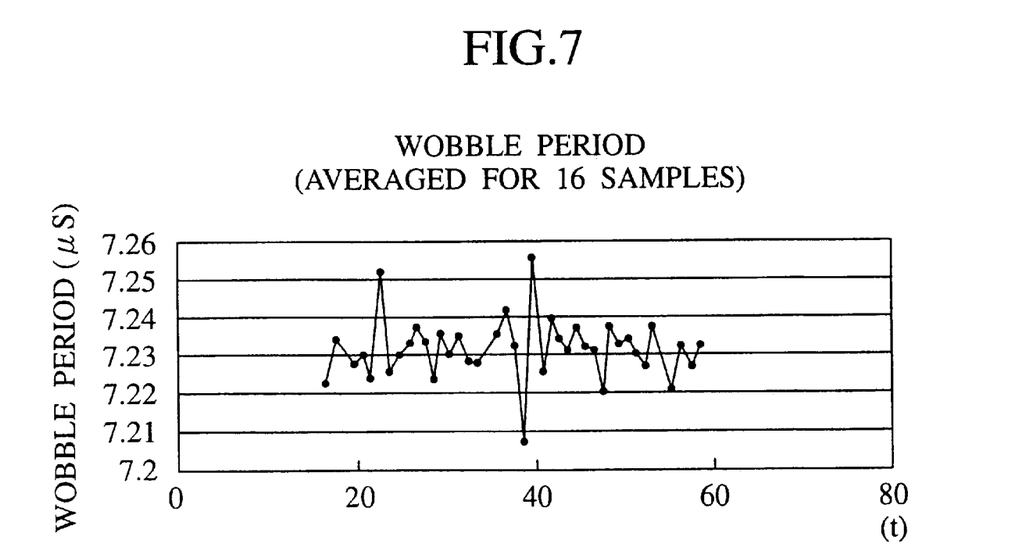
FIG. 7 is a diagram for explaining a cycle deviation of the wobbling pulse whose cycle deviation is corrected by the wobbling pulse extracting portion provided in the disc recording/reproducing apparatus according to an embodiment of the present invention.

FIG. 6 shows the period fluctuation of the wobbling signal outputted from the BPF 27 and FIG. 7 shows the period fluctuation of a wobbling pulse averaged by the wobbling pulse extracting portion 22. It will be apparent from these FIGS. 6, 7 that the period fluctuation of the wobbling signal has been improved to, for example, 1/40 by averaging the wobbling pulse with the wobbling pulse extracting pulse-extracting portion 22. Because the period fluctuation due to the prepit is absorbed by averaging as the prepit period number to be accumulated increases, its improvement rate is raised.

An oscillation period of the divider 54 is updated at every prepit period with a reset signal shown in FIG. 5 or at every predetermined prepit period such as every 3 prepit period, every 5 prepit period.

More specifically, in case where the oscillation period of the divider 54 is updated at every prepit period, a reset signal is supplied to the divider 54 at every prepit period, so that the average value n in a register is rewritten at every prepit period. When the oscillation period of the divider 54 is updated at every predetermined prepit period, a phase reset signal is supplied to the divider 54 at every predetermined prepit period, so that the average value n within the register is rewritten at every predetermined prepit period. The oscillation period of the divider 54 may be updated appropriately depending on the period fluctuation of the wobbling signal.

By updating the oscillation period of the divider 54 appropriately, the oscillation period can be updated corresponding to a period fluctuation of the wobbling signal due to a change in linear speed caused by a disc eccentricity or the like, so that a wobbling pulse having a more accurate period can be generated.

Meanwhile, updating of the oscillation period in the divider 54 may be carried out at every period integer times a prepit period.

Although a gain of the reproduction amplifier 11 shown in FIG. 4 is automatically adjusted by AGC control (automatic gain control) under the supervision of the CPU 16, a large period fluctuation occurs in the wobbling signal due to an influence of AGC response time (for example, about 200 $\mu$s-) at the time of change-over from recording time to reproduction time and change-over from reproduction time to recording time. Thus, the CPU 16 stops updating of the oscillation period of the divider 54 for a predetermined time (until the AGC comes to respond accurately) at the time of change-over from recording time to reproduction time and change-over from reproduction time to recording time.

Consequently, even at the time of change-over from recording time to reproduction time and change-over from reproduction time to recording time, the wobbling pulse (WBLPOL_O) can be outputted at an oscillation period based on the average value n memorized preliminarily in a register of the divider 54 during an interval in which the updating is halted for a predetermined time. Thus, even if a large period fluctuation occurs in the wobbling signal due to an influence of the AGC response time (for example, 200 $\mu$s-), an accurate wobbling pulse (WBLPOL_O) can be outputted without being affected by this period fluctuation.

Further, a stabilized wobbling pulse can be generated at an accurate phase period without using such a complicated circuit as a PLL and the like and cost of the disc recording/ reproducing apparatus can be reduced by simplification of the circuit structure.

Next, the wobbling pulse (WBLPOL_O) generated by the wobbling pulse extracting portion 22 is supplied to the phase comparator 61 and the AC phase shifter 62 in the servo circuit 15 shown in FIG. 5.

A prepit detection output appears at a timing of the phase 90° in the wobbling signal and a LPP$_{Window}$ generating circuit 53 generates a phase comparison timing signal based on the wobbling pulse (WBLPOL_I) from the BPF 27 supplied to the wobbling pulse extracting portion 22 and a count value (measured value m) from the period accumulating portion 50 and then supplies it to the phase comparator 61.

The phase comparator 61 compares the wobbling pulse (WBLPOL_O) from the wobbling pulse extracting portion 22 with a detection signal of the land prepit (LPP) at such a timing when a phase comparison timing signal from the LPP$_{Window}$ generating circuit 53 is supplied, and detects an error in phase between the phase of the wobbling pulse (WBLPOL_O) and the phase of the detection signal of the land prepit (LPP) and then supplies this phase error signal to the AC phase shifter 62.

The AC phase shifter 62 shifts the phase of the wobbling pulse (WBLPOL_O) from the wobbling pulse extracting portion 22 depending on this phase error so as to match the phase of the wobbling pulse (WBLPOL_O) from the wobbling pulse extracting portion 22 with the phase of the detection signal of the land prepit (LPP) and then supplies this to the PLL circuit 63.

The PLL circuit 63 locks the phase of the wobbling pulse in which the phase is matched by this AC phase shifter 62 and supplies this to the pickup 10 and the like shown in FIG. 4 as a recording clock (WTCLK). Consequently, a recording clock (WTCLK) having an accurate phase synchronous with the phase of the prepit can be generated, so that the recording data can be recorded with the recording clock (WTCLK) having the accurate phase.

Meanwhile, although the generation operation of the wobbling pulse and the generation operation of the recording clock at the time of data recording have been described above, in the generation operation of the wobbling pulse, the wobbling pulse is generated even at the time of data reproduction like at the time of recording. For the details, see the above description about the recording time.

As described above, the recording/reproducing apparatus of the present invention can generate the wobbling pulse by suppressing the period fluctuation. For the reason, the recording clock and the reproduction clock can be generated based on the wobbling pulse having an accurate period, so that accurate recording and reproduction of information are enabled.

Further, because the wobbling pulse having an accurate phase period can be generated without use of such a complicated circuit as a PLL circuit, the structure of the recording/reproducing apparatus can be simplified, thereby achieving reduction of production cost.

It should be understood that many modifications and adaptations of the invention will become apparent to those skilled in the art and it is intended to encompass such obvious modifications and changes in the scope of the claims appended hereto.

What is claimed is:

1. A recording and reproducing apparatus for recording and reproducing information in and from a disc-like recording medium including recording tracks each wobbled according to a predetermined frequency and information recording portions in which at least address information is recorded at a predetermined wobbling period interval, the recording and reproducing apparatus comprising:

wobbling signal extracting means for extracting a wobbling signal from a reproduction output from the disc-like recording medium;

reference clock generating means for generating a reference clock having a period shorter than the period of the wobbling signal;

count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value;

dividing means for obtaining an average count value corresponding to an interval of an averaged period of the wobbling pulse by dividing the count value from the count means with the number of the predetermined periods; and wobbling pulse generating means for generating a wobbling pulse having a constant period as a recording and reproducing clock signal by dividing the reference clock based on the average count value.

2. A recording and reproducing apparatus according to claim 1 wherein at every second predetermined periods of the wobbling pulse, processing with the count means and the dividing means are carried out so as to update the average count value.

3. A recording and reproducing apparatus according to claim 2 wherein at the time of change-over from recording of information to reproduction and change-over from reproduction of information to recording, updating of the average count value is not carried out for a predetermined time.

4. A recording and reproducing apparatus according to claim 1 wherein the count means starts accumulation and count of the reference clocks from a beginning of a wobbling pulse at a timing immediate before a wobbling pulse at a timing corresponding to a detection of the information recording portion.

5. A recording and reproducing apparatus according to claim 1 further comprising a phase adjusting means for adjusting the phase of the generated wobbling pulse having the constant period with respect to a recording timing of information recorded in the information recording portion.

6. A recording apparatus for recording information in a disc-like recording medium including recording tracks each wobbled according to a predetermined frequency and information recording portions in which at least address information is recorded at a predetermined wobbling period interval, the recording apparatus comprising:

wobbling signal extracting means for extracting a wobbling signal from a reproduction output from the disc-like recording medium;

reference clock generating means for generating a reference clock having a period shorter than the period of the wobbling signal;

count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value;

dividing means for obtaining an average count value corresponding to an interval of an averaged period of the wobbling pulse by dividing the count value from the count means with the number of the predetermined periods; and wobbling pulse generating means for generating a wobbling pulse having a constant period as a recording clock signal by dividing the reference clock based on the average count value.

7. A reproducing apparatus for reproducing information from a disc-like recording medium including recording tracks each wobbled according to a predetermined frequency and information recording portions in which at least address information is recorded at a predetermined wobbling period interval, the recording and reproducing apparatus comprising:

wobbling signal extracting means for extracting a wobbling signal from a reproduction output from the disc-like recording medium;

reference clock generating means for generating a reference clock having a period shorter than the period of the wobbling signal;

count means for binarizing the wobbling signal extracted by the wobbling signal extracting means to obtain a wobbling pulse and for counting and accumulating the number of pulses of the reference clock from the reference clock generating means for predetermined periods of the wobbling pulse to obtain a count value;

dividing means for obtaining an average count value corresponding to an interval of an averaged period of the wobbling pulse by dividing the count value from the count means with the number of the predetermined periods; and wobbling pulse generating means for generating a wobbling pulse having a constant period as a reproducing clock signal by dividing the reference clock based on the average count value.

8. A recording and reproducing method for recording and reproducing information in and from a disc-like recording medium including recording tracks each wobbled according to a predetermined frequency and information recording portions in which at least address information is recorded at a predetermined wobbling period interval, the method comprising the steps of:

extracting a wobbling signal from a reproduction output from the disc-like recording medium;

generating a reference clock having a period shorter than the period of the wobbling signal;

binarizing the extracted wobbling signal to obtain a wobbling pulse;

counting and accumulating the number of pulses of the reference clock for predetermined periods of the wobbling pulse to obtain a count value;

obtaining an average count value corresponding to an interval of an averaged period of the wobbling pulse by dividing the count value with the number of the predetermined periods; and generating a wobbling pulse having a constant period as a recording and reproducing clock signal by dividing the reference clock based on the average count value.

* * * * *